United States Patent [19]

Maertens

[11] Patent Number: 5,727,036
[45] Date of Patent: Mar. 10, 1998

[54] HIGH BIT RATE START CODE SEARCHING AND DETECTING CIRCUIT AND METHOD

[75] Inventor: James N. Maertens, Sunnyvale, Calif.

[73] Assignee: Mitsubishi Semiconductor America, Inc., Durham, N.C.

[21] Appl. No.: 561,756

[22] Filed: Nov. 22, 1995

[51] Int. Cl.$^6$ .................................................. H04L 25/38
[52] U.S. Cl. .............................. 375/369; 375/368; 370/305
[58] Field of Search .............................. 375/368, 369; 370/305, 514

[56] References Cited

U.S. PATENT DOCUMENTS

| | | | |
|---|---|---|---|
| 4,121,259 | 10/1978 | Preuss et al. | 358/261 |
| 4,569,062 | 2/1986 | Dellande et al. | 375/117 |
| 4,737,765 | 4/1988 | Minuhin | 340/347 |
| 4,748,643 | 5/1988 | Setoguchi et al. | 375/117 |
| 4,811,366 | 3/1989 | Kage | 375/116 |
| 4,841,299 | 6/1989 | Weaver | 341/65 |
| 4,899,149 | 2/1990 | Kahan | 341/67 |
| 5,058,141 | 10/1991 | Kem et al. | 375/116 |
| 5,140,619 | 8/1992 | Aubie et al. | 375/116 |
| 5,206,887 | 4/1993 | Jsuda et al. | 375/114 |
| 5,214,507 | 5/1993 | Aravind et al. | 358/133 |
| 5,227,789 | 7/1993 | Barry et al. | 341/65 |
| 5,254,991 | 10/1993 | Ruetz et al. | 341/65 |
| 5,278,647 | 1/1994 | Hingorani et al. | 358/136 |
| 5,363,418 | 11/1994 | Nakano et al. | 375/117 |
| 5,550,833 | 8/1996 | Fujisawa | 370/105.4 |
| 5,621,772 | 4/1997 | Maturi et al. | 375/366 |
| 5,636,369 | 6/1997 | Perren | 395/500 |

*Primary Examiner*—Stephen Chin
*Assistant Examiner*—Mohammad Ghayour
*Attorney, Agent, or Firm*—Lowe, Price, LeBlanc & Becker

[57] ABSTRACT

A high bit rate start code monitoring, searching and detecting circuit includes a Least Significant Bit (LSB) zero counter, a Most Significant Bit (MSB) zero counter, first and second adders, first and second registers, a comparator, a start code detector, and a start code decoder. The LSB zero counter counts the number of consecutive zero bits from the least significant bit while the MSB zero counter counts the number of consecutive zero bits starting with the most significant bit. A LSB zero count output is added with a prescribed value by the first adder to arrive at a Zero_Bits_Shifted_Out (ZBSO) value, which is saved in the first register. A MSB zero count output is added with the stored value of the ZBSO value during the subsequent clock cycle. If the summed (S) value is greater than or equal to 23, then the start code detector is enabled. The start code detector can detect parts of a start code contained in two separate bitstreams or a start code embedded in a bitstream. When enabled by a signal from the start code detector, the start code decoder analyzes the upper 8 bits of the bitstream to output the corresponding start signal to identify a MPEG layer to a central processing unit or a variable length decoder prior to decoding of the encoded bitstream data.

22 Claims, 5 Drawing Sheets

L-23: REPRESENTS LOWER 23 BITS OF BITSTREAM
U-8: REPRESENTS UPPER 8 BITS OF BITSTREAM
**NOTE: THIS ADDER PERFORMS THE FOLLOWING EQUATION
A+B-32 (NEGATIVE VALUES = 0)

0000 0000 0000 0000 0000 0001 XXXX XXXX
START CODE PREFIX        START  CODE
                         VALUE

Figure 2

CYCLE
N      N th     BITSTREAM    XXXX XXXX XXXX XXXX 0000 0000 0000 0000
N+1    N+1 th   BITSTREAM    0000 0000 0000 0001 XXXX XXXX XXXX XXXX

Figure 5A

(1) X000 0000 0000 0000 0000 0000 1XXX XXXX
(2) XX00 0000 0000 0000 0000 0000 01XX XXXX
(3) XXX0 0000 0000 0000 0000 0000 001X XXXX
(4) XXXX 0000 0000 0000 0000 0000 0001 XXXX
(5) XXXX X000 0000 0000 0000 0000 0000 1XXX
(6) XXXX XX00 0000 0000 0000 0000 0000 01XX
(7) XXXX XXX0 0000 0000 0000 0000 0000 001X
(8) XXXX XXXX 0000 0000 0000 0000 0000 0001

Figure 5B

| CYCLE | HEXADECIMAL | BINARY |
|---|---|---|
| 1 | 98ABCDEF | 0000 1001 1010 1011 1100 1101 1110 1111 |
| 2 | 01234567 | 0000 0001 0010 0011 0100 0101 0110 0111 |
| 3 | 12340000 | 0001 0010 0011 0100 0000 0000 0000 0000 |
| 4 | 0001B312 | 0000 0000 0000 0001 1011 0011 0001 0010 |
| 5 | B3123456 | 1011 0011 0001 0010 0011 0100 0101 0110 |
| 6 | 12345678 | 0001 0010 0011 0100 0101 0110 0111 1000 |
| N | 80000010 | 1000 0000 0000 0000 0000 0000 0001 0000 |
| N+1 | 00ABCDEF | 0000 0000 1010 1011 1100 1101 1110 1111 |

| CYCLE | BITSTREAM | BS_SHIFT | LSB | MSB | ZBSO | LSB_STORE | S_VALUE | EN1 | SHIFT | DETECT OUTPUT | DETECT/EN2 | START |
|---|---|---|---|---|---|---|---|---|---|---|---|---|
| 1 | 98ABCDEF | 32 | 0 | 0 | 0 | - | 0 | NO | 32 | NO | NO | NO |
| 2 | 1234567 | 32 | 0 | 7 | 3 | 0 | 7 | NO | 32 | NO | NO | NO |
| 3 | 12340000 | 32 | 18 | 3 | 18 | 3 | 6 | NO | 32 | YES | NO | NO |
| 4 | 0001B312 | 16 | 1 | 15 | 0 | 18 | 32 | YES | 16 | NO | YES | YES |
| 5 | B3123456 | 8 | 1 | 0 | 0 | 0 | 0 | NO | 32 | NO | NO | NO |
| 6 | 12345678 | 12 | 3 | 3 | 0 | 0 | 3 | NO | 32 | YES | NO | NO |
| N | 80000010 | 32 | 4 | 0 | 4 | Y | Y+4<23 | NO | 28 | NO | NO | NO |
| N+1 | 00ABCDEF | 32 | 0 | 8 | 10 | 4 | 12 | NO | 32 | NO | YES | YES |

Figure 8

HIGH BIT RATE START CODE SEARCHING AND DETECTING CIRCUIT AND METHOD

TECHNICAL FIELD

The present invention relates to detection of start codes, and in particular, to a circuit for and a method of detecting start codes in digital signals.

BACKGROUND ART

The Motion Picture Experts Group (MPEG) standard is an international standard for the compression and communication of motion video pictures and audio. The MPEG standard allows full motion video images to be transmitted at rates of up to thirty frames per second (fps). MPEG allows motion picture video to be compressed along with corresponding high quality sound and provides other features such as single frame advance, reverse motion, and still frame video.

The decoding and processing of MPEG video bitstreams are critical to the performance of any MPEG decoding system. Compressed MPEG data is contained in a digital bitstream consisting of various parameters needed in reconstructed audio and video data. The MPEG bitstream can easily be divided into two bitstreams, audio and video.

There are currently two versions of MPEG video standard which have been standardized, commonly referred to as MPEG1 and MPEG2. In general, MPEG2 has a higher resolution than MPEG1 and can handle more functions. The MPEG video bitstream consists of different layers of parameter information, as well as the actual compressed video data.

FIGS. 1A and 1B show a video bitstream layer organization of the MPEG1 and MPEG2 standards. The MPEG1 standard comprises a sequence layer 1a, extension and user layers 1c, 2b and 3c, group of pictures layer 2a, a picture layer 3a, a slice layer 4, a macroblock layer 5a, a block layer 5b and an end of sequence layer 1b. Additionally, MPEG2 includes a sequence extension layer 1b and a picture coding layer 3b. Such MPEG1 and MPEG2 layer organizations define the entire transmission of the video data.

Each layer of sequence, sequence extension, group of pictures, etc. contains various bits of information of the actual image. The block layer 5b contains the actual data of the picture. All the prior layers comprise preliminary information needed for the data of the block layer 5b. The sequence layer 1a defines the size of the picture that is being sent. For example, the picture size for a television is fixed, whereas in other applications, such as a computer, the picture size can vary. The sequence layer 1a does not have to be sent often and is sent only when an update of one of the sequence parameters, such as picture size, is required.

The sequence extension layer 1b is a later revision of the MPEG1 and allows more bits to be use to define larger size pictures. The number of bits in the MPEG1 allows a picture size only up to a certain limit. With the sequence extension layer 1b, the MPEG2 allows the size of higher resolution pictures, such as high definition television (HDTV), to be defined. For example, the sequence layer 1a of the MPEG1 uses 12 bits to define the size of the picture, e.g., the horizontal size. In the U.S., the horizontal size is 720 pixels in digital television, but the horizontal size increases to 1440 pixels in HDTV. The sequence layer 1a of MPEG1 is insufficient to define such a size, and additional bits of the sequence extension layer 1b are used to define the picture size of the HDTV.

The extension and user layers 1c, 2b and 3c are used to include data for the entity's own applications. In other words, whoever encodes the data can place this extra user data in the video bitstream. Such data can be used, for example, to place special company insignia on the picture to be displayed. The extension and user layers 1c, 2b and 3c are not necessary and can be skipped, as shown by an arrow going from the sequence layer 1a to a group of pictures layer 2a.

The group of pictures layer 2a defines one or more pictures in a particular area. For example, the group of pictures layer 2a may define how many pictures there are through an entire movie or a video sequence. The group of pictures layer 2a also allows the breakdown of the video hierarchy. Since the group of pictures layer 2a is not necessary, MPEG2 allows this layer to be skipped over to the picture layer 3a which includes the data of an actual picture frame. Under the National Television System Committee (NTSC) standard, there is a requirement for thirty picture frames per second. However, there is no upper limit as to the number of pictures per group of pictures.

The slice layer 4 allows the picture to be broken down into different areas or slices. There can be one slice of a picture constituting one entire picture, or multiple slices. For example, every macroblock, or 16×16 pixel area, or combination of microblocks, of the picture can comprise one slice. Such a breakdown of the picture facilitates a recovery of the picture when an error is detected.

If the picture is not broken down into slices and an error is detected, the error can destroy the entire picture since there is no way to recover from the error until the next picture is produced. By breaking down the picture into slices, error recovery can be accomplished when a subsequent slice of the picture is received. There may be only one bad area of the picture, but the entire picture is not lost. It is also easier to handle error concealment based upon a slice since there is a smaller area to conceal rather than the entire picture.

The macroblock and block layers 5a and 5b include the real data for the display screen. One macroblock layer 5a includes 6 sub-blocks of data. However, the data required for the display screen needs to be in various formats. For example, in a computer, an RGB (Red, Green, Blue) format is used to display the picture on the screen. In a TV, luminous, chromonous blue and chromonous red signals are required. The MPEG1 and MPEG2 use this data format to form the picture on the display screen. The luminous signal defines the brightness of a pixel, and the chromonous blue and red signals provide the color for the display screen. Four sub-blocks of data are assigned to the luminous signal. One sub-block is assigned to the chromonous red signal and one sub-block is assigned to the chromonous blue signal.

Further, each sub-block of data has information regarding an 8 by 8 pixel area on the screen. Hence, the macroblock layer 5a contains 64 coefficients of data for displaying the picture on the display screen. After the macroblock layer 5a is sent, the block layer 5b containing the video data for the picture on the screen is included in MPEG1 or MPEG2.

MPEG2 also includes a picture coding layer 3b. This layer is similar to the sequence extension layer 1b. In MPEG2, there are various formats available for displaying the picture on the screen. These formats allow different portions of the picture to be displayed. For example, the picture frames of a movie displayed on television have sides cut off, because the movie screen is comparatively much wider than the TV screen due to the differing aspect ratios. Using the picture coding layer 3b, the data to cut off the sides of the movie can be specified.

The initial step in decoding any MPEG encoded video bitstream is the extraction of the parameters and video data. Some designs use an internal central processing unit, i.e., a CPU chip, to detect the sequence layer and sequence extension layer, etc. However, other designs utilize a circuit known as a Variable Length Decoder (VLD). The main function of the VLD is to parse the MPEG video bitstream and extract all the parameters and video data, which are subsequently provided to other circuits to reproduce the video pictures.

For example, the highest level of any MPEG video bitstreams is the sequence layer 1a. Therefore, the VLD must search and detect a sequence layer 1a in the bitstreams before any video data can be decoded. The VLD must also be able to automatically detect whether the incoming bitstreams are MPEG1 or MPEG2 by the presence or lack of the sequence extension layer 1b. These tasks should be done as quickly as possible and with very high reliability.

To identify the sequence, extension, user, group of pictures, slice layers, etc., each layer includes a unique start code. The CPU or VLD initiates the decoding of the encoded MPEG bitstreams after the detection of the start code. As illustrated in FIG. 2, the start code comprises twenty-four bits of a start code prefix and eight bits of a start code value. The start code prefix is identified by a string of twenty-three consecutive zero bits followed by a one bit. The 8-bit start code value defines whether the subsequent bitstreams are a sequence layer data, a picture layer data, extension layer data, etc. The start codes can be detected without any actual decoding of the encoded MPEG bitstreams since the prefix of 23 zeros and one bit is unique in the bitstreams.

The function and performance of an entire video display system is directly dependent on the ability to quickly and systematically detect these start codes. For example, the function and performance of TVs are directly related to detection of the start codes. When a channel is switched to a different station, a decoder of the TV must reset what was being decoded and immediately search for the start code of a new picture on a different channel. The TV requires new sequence layer data, new header layer data, etc. If a start code detection device of the TV processes only one bit per clock cycle, the viewer may have to wait at least a half a second to a full second for a particular channel to come into tune on the TV. To a viewer quickly flipping through the channels, such a delay is not acceptable.

Many factors are considered in designing a start code searching circuit including:
Number of bits processed per clock cycle
Chip area
Power dissipation Conventional circuits often exhibit one or more of the following problems: large gate count, small bit processing per clock cycle or high power consumption. Such circuits often use two or more barrel shifters. Barrel shifters are large in chip area, dissipate a large amount of power, and are slow. One design to reduce the barrel shifter area problem reduces the number of bits processed per every clock cycle. However, this is not a practical solution for high speed video decoding systems. Accordingly, an improved start code searching circuit is needed to improve the function and performance of video decoders in video display systems.

DISCLOSURE OF THE INVENTION

An advantage of the present invention is in improving function and performance in a video display system.

Another advantage of the present invention is in increasing the number of bits processed per clock cycle within a video display system.

Still another advantage of the present invention is in decreasing a chip area of a circuit.

A further advantage of the present invention is in decreasing power consumption of a circuit implemented in a video display system.

A further advantage of the present invention is in continuously monitoring the bitstreams to detect a start code in such a system.

Another advantage of the present invention is in a capability to detect start codes at any time and in any position of the bitstreams with a video display system.

Another advantage of the present invention is in compensating for unexpected detection of a start code within the system.

Still another advantage of the present invention is in improving error recovery in a video display system.

A further advantage of the present invention is in quickly and systematically detecting start codes in the system.

Another advantage of the present invention is in quickly skipping a picture for the purpose of synchronizing the audio and video presentations.

According to the present invention, the foregoing and other advantages are achieved in part by a circuit and a method for monitoring, searching for and detecting start codes at a high bit rate. The circuit includes a Least Significant Bit (LSB) zero counter, a Most Significant Bit (MSB) zero counter, first and second adders, first and second registers, a comparator, a start code detector, and a start code decoder appropriately interconnected.

The LSB zero counter counts the number of consecutive zero bits of a predetermined number of least significant bits. The MSB zero counter counts the number of consecutive zero bits of a predetermined number of most significant bits. A LSB zero count output is added with a predetermined BS_SHIFT value, and the sum then subtracted by a constant value by the first adder to arrive at a Zero_Bits_Shifted Out (ZBSO) value. The ZBSO value is then stored in the first register as a LSB_Store value, which is added with a MSB zero count output during the subsequent clock cycle. If the summed (S) value is greater than or equal to a prescribed value, the start code detector is enabled.

The start code detector can detect partial start codes contained in two separate bitstreams, and can also detect a start code embedded in a single bitstream. When activated, the start code detector outputs a detect output signal, which is stored in the second register to activate the start code decoder during the next clock cycle.

When activated, the start code decoder analyzes the upper 8 bits of the bitstream. Because the start code detector has shifted out a start code prefix of the start code during a previous clock cycle, these eight bits comprise the start code value. Thereafter, the start code decoder outputs the corresponding start signal identifying the MPEG layer of the bitstreams.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF DRAWINGS

The invention will be described in detail with reference to the following drawings in which like reference numerals refer to like elements wherein:

FIG. 2 shows a start code having a start code prefix of 24 bits and a start code value of 8 bits;

FIG. 5A shows partial start codes contained in two 32-bit bitstreams;

FIGS. 5B(1)–5B(8) show a start code embedded within a single 32-bit bitstream;

FIG. 8 shows a binary conversion of the bitstreams in hexadecimal format shown in FIG. 7.

BEST MODE FOR CARRYING OUT THE INVENTION

Figure 1A:
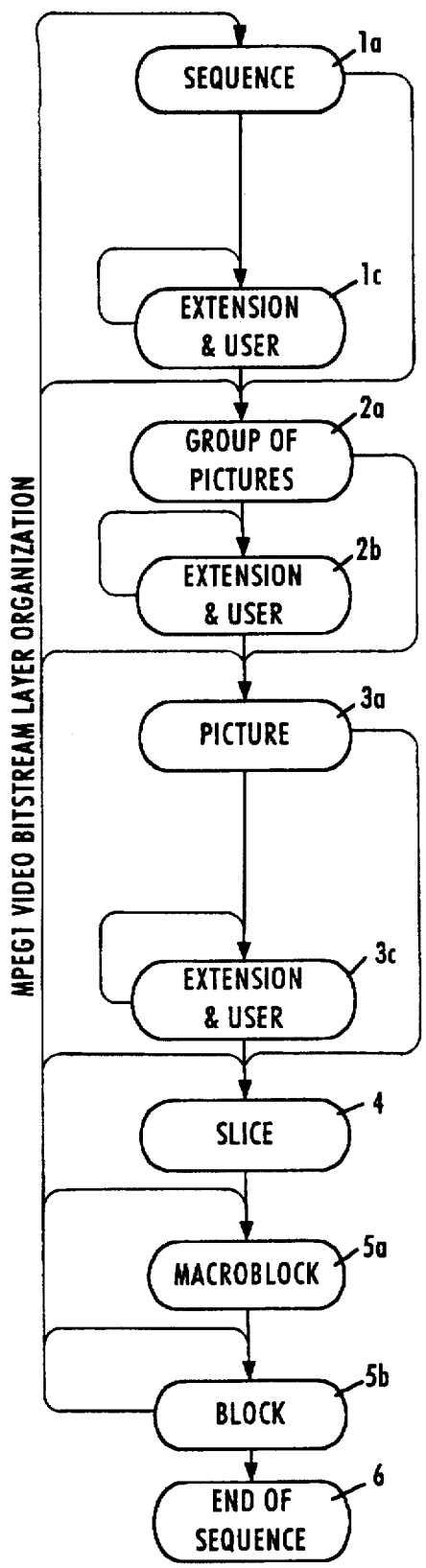
FIGS. 1A and 1B show a video bitstream layer organization of the MPEG1 and MPEG2 standards.
Figure 1B:
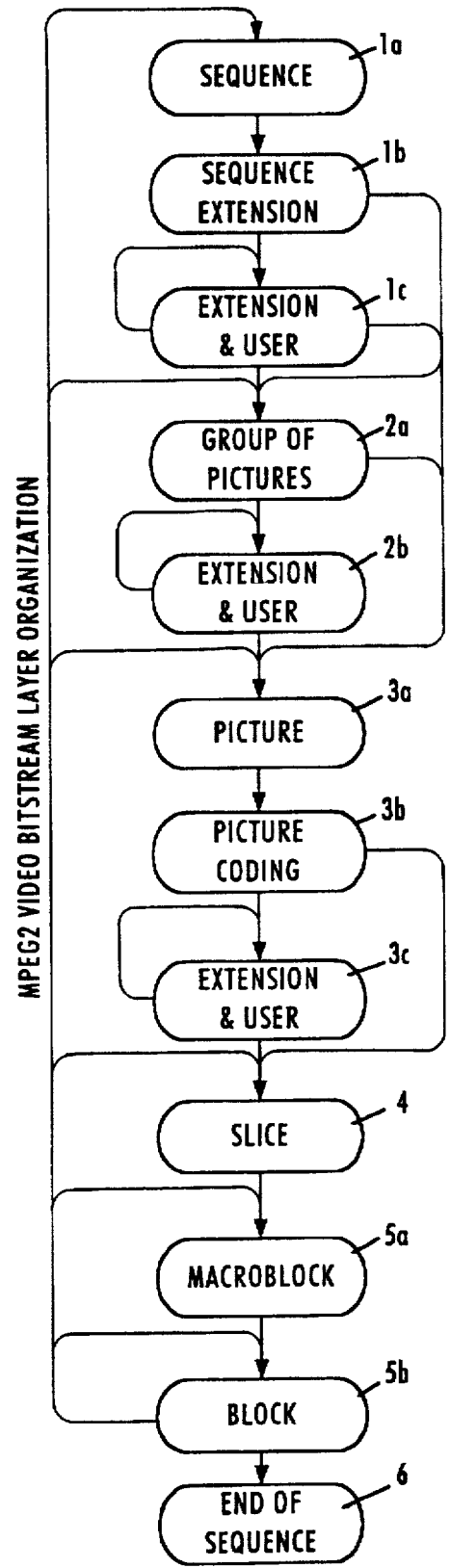
Figure 3:
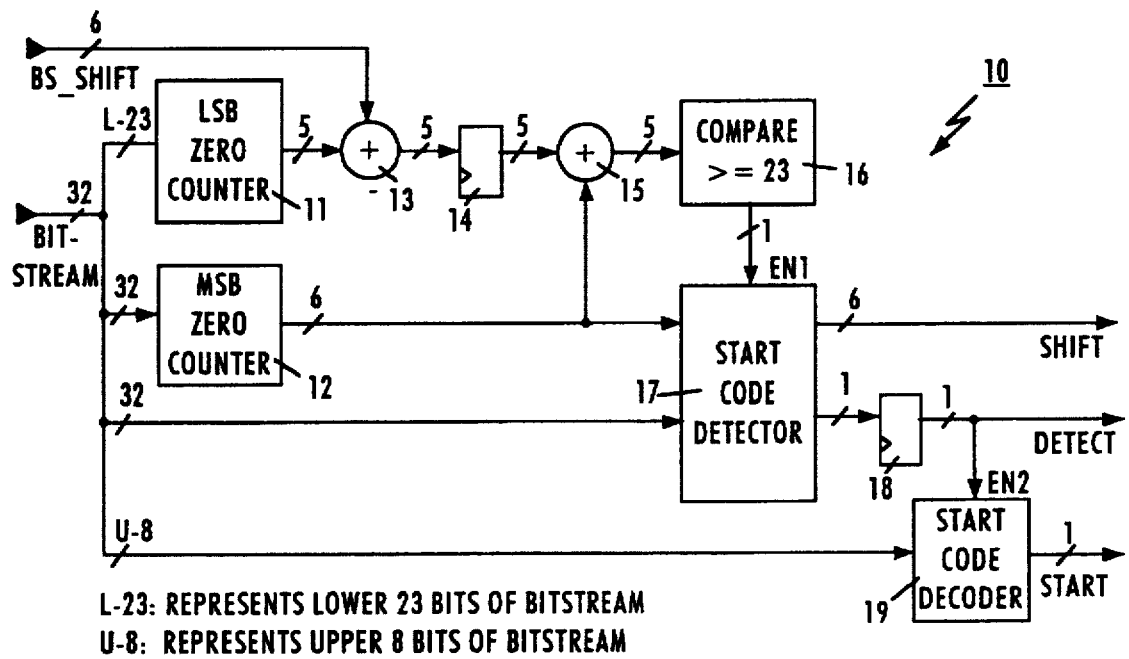
FIG. 3 shows a high bit rate start code monitoring, searching and detecting circuit in accordance with an embodiment of the present invention.

FIG. 3 shows a high bit rate monitoring, searching and detecting circuit 10 in accordance with a preferred embodiment of the present invention. The circuit incorporates a design based on an approach of counting and storing the number of consecutive leading and trailing zero bits at each clock cycle. These zero bit count values are used to monitor, search and detect the presence of a start code on the current or next clock cycle.

The high bit rate start code monitoring, searching and detecting circuit 10 comprises a 23-bit Least Significant Bit (LSB) zero counter 11 and a 32-bit Most Significant Bit (MSB) zero counter 12 in a parallel configuration, each coupled to an adder 13 or 15, and a register 14 is coupled in-between the adders 13 and 15. The results of the adder 15 is inputted to a comparator 16 coupled to a start code detector 17. The start code detector receives the zero count value of the MSB zero counter and the 32-bit bitstream to determine a SHIFT value and a detect output signal which is stored in a register 18. The register 18 outputs the detect output signal during a subsequent clock cycle as DETECT/EN2 signal, which is used to activate a start code detector 19. Detailed descriptions of the zero counters, adders, registers and comparators themselves are omitted for simplicity, since one of ordinary skill in the art will be familiar with these components.

The inputs to the circuit 10 are a 6-bit BS_SHIFT value and a 32-bit bitstream. The BS-SHIFT value is the number of bits decoded during each clock cycle in the VLD, and the 32-bit bitstream is the number of bits the VLD processes during each clock cycle. A description of a VLD incorporating the circuit of the present invention can be found, for example, in U.S. application Ser. No. 08/567,592, filed on Dec. 15, 1995, incorporated herein by reference. The labels on the bus lines indicate the bit size of the bus line. The label "L-23" represents the 23 least significant bits of the bitstream, and label "U-8" represents the 8 most significant bits of the bitstream, i.e., bits 31–24.

The LSB and MSB zero counters 11 and 12 operate as priority encoders for counting the number of consecutive zero bits. The LSB zero counter 11 counts the number of consecutive zero bits starting with the least significant bit up to the twenty-third bit position. The MSB zero counter 12 counts the number of consecutive zero bits starting with the most significant bit, and a maximum of thirty-two bits is analyzed. Both counters count the number of zeros until the counters encounter the first non-zero bit. The counters then stop counting and ignore the remaining bits.

A 5-bit LSB zero count output is added with the current BS_SHIFT value, and the summation is then subtracted with a constant value of thirty-two by the adder 13 to arrive at a Zero_Bits_Shifted_Out (ZBSO) value, as follows.

$$ZBSO=(LSB\_Zero\_Count+BS\_SHIFT)-32$$

If the result is a negative number, then the ZBSO value is set to zero. The maximum value for BS_SHIFT is thirty-two, and the maximum value for the LSB zero count output is twenty-three. According to the above equation, the result will be between the value of 0 and 23. Hence, only five bits are necessary to represent the ZBSO value. The ZBSO value is then stored in a 5-bit register 14 as a LSB_Store value for use in the next clock cycle. A 6-bit MSB zero count output is added with the LSB_Store value from the previous clock cycle. If the summed (S) value is greater than or equal to 23, the comparator 16 outputs an enable signal EN1 of an appropriate potential to activate the start code detector 17.

The start code detector 17 can detect partial start codes contained in separate bitstreams or a string of 23 zero bits followed by one bit which is embedded in the bitstream. If the start code detector 17 is not activated or no embedded start code is detected, a SHIFT value of thirty-two is outputted. This SHIFT value of thirty-two is used to shift in a new 32-bit bitstream for processing.

If the start code detector 17 is activated/enabled and the current bitstream does not contain the entire start code prefix, the SHIFT value is set to the number of bits remaining of the start code prefix in the current bitstream which precede the start code value. When activated, the start code detector 17 outputs a detect output signal to be stored in the register 18 which is used to enable the start code decoder 19 during the next clock cycle.

The register 18 outputs the detect output signal as a DETECT signal and an enable signal EN2. The DETECT signal is sent to the CPU or VLD to indicate a detection of a start code, and the enable signal EN2 activates or deactivates the start code decoder 19 during the subsequent clock cycle. When activated by the enable signal EN2, the start code decoder 19 analyzes the upper 8 bits of the bitstream to determine the start code value since the start code detector 19 shifted out the start code prefix during the previous clock cycle. Thereafter, the corresponding start signal is outputted identifying to the CPU or VLD the MPEG layer of the bitstreams.

Figure 4:
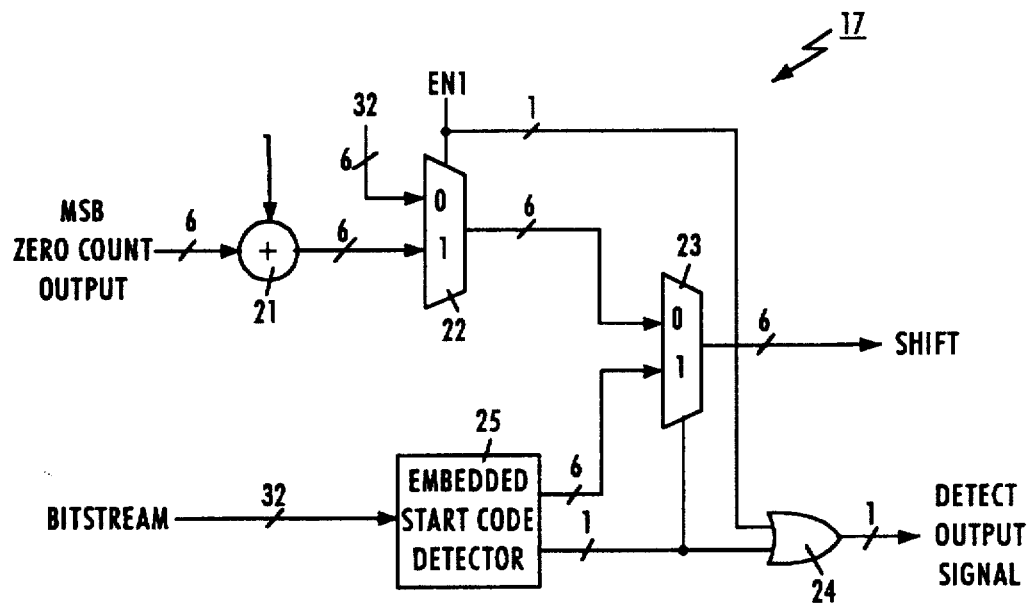
FIG. 4 is a detailed illustration of a start code detector of FIG. 3.

FIG. 4 is a detailed illustration of the start code detector 17, which comprises an adder 21, two selectors 22 and 23, an OR gate 24 and an embedded start code detector 25. As shown in FIGS. 5A and 5B, parts of a start code can be contained in two 32-bit bitstreams (FIG. 5A), or the entire start code prefix can be embedded within a single 32-bit bitstream (FIG. 5B). The label "X" indicates that the value at the particular bit position can be either a binary "0" or "1". The start code detector 17 can detect both occurrences of the start codes.

Prior to the N+1th bitstream, the enable signal EN1 indicates non-detection of the start code. In such a case, the selector 22 selects Input_0, receiving a value of thirty-two on a 6-bit bus line as the output, which is applied to Input_0 of the selector 23. If no embedded start code prefix is detected on the 32-bit bus line connected to the embedded start code detector 25, a 1-bit signal is outputted by the detector 25 indicating a non-detection of the start code. This signal is applied to the selector 23 in selecting the value applied to Input_0 as the output. The SHIFT value of thirty-two is outputted when there is no detection of a start code.

The SHIFT value indicates the number of bits in the current bitstream which should be shifted out for the next bitstream. If the SHIFT value is 32, the entire 32 bits of the current bitstream at clock cycle N (N being an integer) are shifted out, and a new 32-bit bitstream is applied to the searching circuit at the next clock cycle N+1. However, if the SHIFT value is less than 32, only the most significant bits up to the SHIFT value is shifted out, and the remaining bits of the current bitstream are retained in the 32-bit bitstream of the next clock cycle.

The enable signal EN1 and the 1-bit output from the detector 25 are logically ORed. Since both signals in this instance indicate non-detection of the start code, the detect output signal indicates non-detection. If either of the signals, the EN1 signal or the 1-bit output indicates detection, the result of the OR gate 24, i.e., the detect output signal, will indicate the detection of a start code.

The operation for monitoring, searching and detecting a start code contained in two 32-bit bitstreams is as follows with reference to FIGS. 3, 4 and 5A. During the Nth clock cycle, the BS_SHIFT has a value of 32. Assuming that the label "X" at a bit position 16 has a binary value "1", the LSB zero counter 11 counts sixteen zeros from the least significant bit of the Nth bitstream. Based on the above equation, a value of sixteen is stored in register 4.

During the N+1th clock cycle, the MSB zero counter counts fifteen zeros from the most significant bit of the N+1 bitstream. The MSB zero count output of fifteen is added with the LBS_Stored value of sixteen stored in the register 4 from the previous clock cycle. Since the result, i.e., S_value equals 31, is greater than 23, the enable signal EN1 indicating detection of a start code is applied to the start code detector 17.

As shown in FIG. 4, the selector 22 selects Input_1 as the output. In this instance, the MSB zero count value of fifteen is added with a value of one by the adder 21 to output sixteen on the 6-bit bus connected to input_1. Since there is no detection of an embedded start code, the selector 23 outputs the value of sixteen at the input "0" as the SHIFT value.

Incrementing the MSB zero count output by one is required since the start code prefix comprises 23 zeros followed by a binary "1" before the 8-bit start code value (see FIG. 2). Since the SHIFT value indicates the number of bits in the current bitstream to be shifted out, all the zeros from the most significant bit up to the binary "1" of the start code prefix needs to be shifted out. The next 32-bit bitstream will then contain the 16 bits from the N+1th clock cycle which have not been shifted out, and additional new 16 bits. The most significant eight bits of the next bitstream are the start code value.

As shown in FIGS. 3 and 4, the detect output signal will indicate the detection of the start code, and the detect output signal is stored in the register 18 which is outputted during the Nth clock cycle. At the N+1th clock cycle, this signal is applied as the DETECT signal and as the enable signal EN2 to activate the start code decoder 19. The upper eight bits of the bitstream containing the start code value is applied to the start code detector, and decoded to determine the MPEG layer of the bitstreams.

If the start code prefix is embedded in a single 32-bit bitstream, the embedded start code detector 25 outputs a 1-bit signal indicating this detection. The selector 23 selects the value on the 6-bit bus connected to Input_0 as the SHIFT value, and the OR gate 24 outputs a detect output signal indicating the detection of the start code prefix. As described above, this detect output signal is stored in the register 18, which is used to activate the start code detector 19 at the next clock cycle.

The SHIFT value indicates the number of bits to be shifted out from the current bitstream. The 6-bit value outputted by the detector 25 indicates the number of most significant bits preceding the start code prefix and all 24 bits of the start code prefix. For example, if the embedded bitstream shown in FIG. 5B(1) is applied, the detector 25 outputs a value of twenty-five as the 6-bit value to input_1. The SHIFT value will be twenty-five, and the 25 most significant bits are shifted out while the remaining 7 bits will be used as the 7 most significant bits of the next 32-bit bitstream. At the next clock cycle, the start code decoder 19 decodes the 8 most significant bits to determine the start code value.

Figures 6, 7:
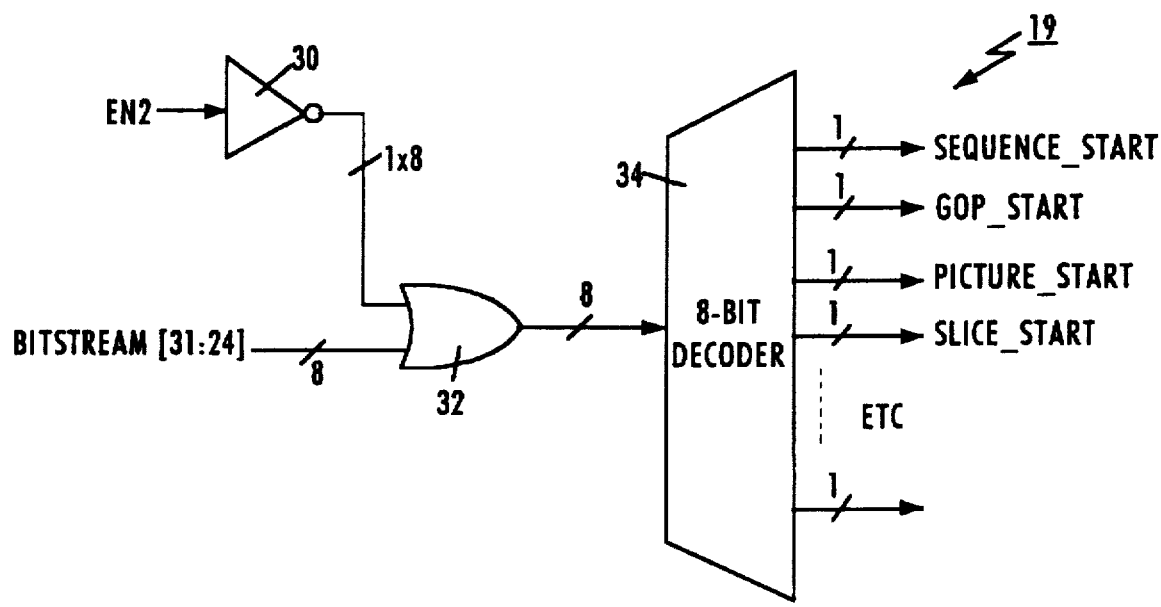
FIG. 6 is a detailed illustration of a start code decoder of FIG. 3.
FIG. 7 shows a search operation of the high bit rate start code monitoring, searching and detecting circuit of the present invention.

FIG. 6 is a detailed illustration of the start code decoder 19, which includes a NOT gate 30, an OR gate 32 and a 8-bit decoder 34. The NOT gate 30 inverts the EN2 signal and expands the /EN2 signal to eight bits. Each of the eight bits of the expanded /EN2 signal is logically ORed with the corresponding upper eight bits of the bitstream. The result is applied to the decoder 34 to generate a start signal identifying the sequence, group of picture, picture, slice, etc, layers.

For example, if the 8-bit ORed result is "1011 0011", the decoder 34 outputs a signal on the Sequence_Start output line. On the other hand, if the 8-bit ORed result is "0000 0000", the decoder 34 outputs a signal on the Picture_Start output line to indicate the detection of the picture layer. In FIG. 3, the START signal is shown as a single line since only one of the output lines of the 8-bit decoder is active when a start code value is decoded.

FIG. 7 shows a search and detecting operation of the high bit rate start code searching circuit 10. For clarification, FIG. 8 shows the binary conversion of the bitstream shown in hexadecimal format of FIG. 7. The bold text in FIG. 7 indicates the start code prefix and the start code value within the 32-bit bitstreams.

During the first clock cycle, the 32-bit bitstream of "89ABCDEF" (hexadecimal format) or "1000 1001 1010 1011 1100 1101 1110 1111" and a BS_SHIFT value of 32 is applied to the circuit 10. The LSB zero counter counts, from the least significant bit, the number of zeros until the binary "1" is detected, and the MSB zero counter counts from the most significant bit the number of zeros until a binary "1" detected. In this case, the LSB and MSB zero count outputs are zero.

The adder 13 determines the ZBSO value based on the above equation, and outputs a zero, which is then stored in the register 14 as the LBS_Store value. At the same time, the previously stored LBS_Store value is outputted to the adder 15. As shown in FIG. 4, there is no previously stored value in clock cycle 1, and the LBS_Store value is a blank, e.g., equivalent to a zero. The LBS_Store value is added with the MSB zero count output, which results in a S_value of zero.

Since the S_value is less than twenty-three, the enable signal EN1 from the comparator does not activate the start code detector 17. When non-active, the start code detector 17 automatically outputs a SHIFT value of thirty-two, which is sent to the VLD or the CPU to shift in a new 32-bit bitstream. The detect output signal from the start code detector 17 has an appropriate signal potential indicating non-detection of the start code. Hence, when a 1-bit signal is outputted from the register 18 during the next clock cycle, e.g., clock cycle 2, the DETECT signal indicates non-detection of the start codes, and the start code decoder is not enabled by the enable signal EN2.

During the second clock cycle, a new 32-bit bitstream of "01234567" (hexadecimal format) or "0000 0001 0010 0011 0100 0101 0110 0111" and a BS_SHIFT value of 32 is inputted into the circuit 10. The LSB zero count output is zero while the MSB zero count output is 7. The adder 13 determines the ZBSO value to be three based on the above equation, which is then stored in the register 14 as the LBS_Store value. The previously stored LBS_Store value of zero is outputted to the adder 5. The LBS_Store value is added with the MSB zero count output, which results in a S_value of seven.

Since the S_value is less than twenty-three, the enable signal EN1 from the comparator does not activate the start code detector 17. The start code detector 17 automatically outputs a SHIFT value of thirty-two, which is sent to the VLD or the CPU to shift in a new 32-bit bitstream. The output detect signal from the start code detector 17 indicates non-detection of the start code. Hence, when a 1-bit signal is outputted from the register 18 during the next clock cycle, e.g., clock cycle 3, the DETECT signal indicates non-detection of a start code, and the start code decoder 19 is not enabled by the enable signal EN2.

A new 32-bit bitstream of "12340000" or "0001 0010 0011 0100 0000 0000 0000 0000" and a BS_SHIFT value of thirty-two is inputted into the searching circuit during the third clock cycle. The LSB zero count output is eighteen, and the MSB zero count output is three. The adder 13 determines the ZBSO value to be eighteen based on the above equation, which is then stored in the register 14 as the LBS_Store value, and the previously stored LBS_Store value of three is outputted to the adder 5. The LBS_Store value is added with the MSB zero count output, which results in a S_value of six. Like clock cycles 1 and 2, a SHIFT value of thirty-two is sent to the VLD for the next 32-bit bitstream, and the DETECT/EN2 signals indicates non-detection and non-enablement of the start code decoder 19.

During the fourth clock cycle, another 32-bit bitstream of "0001B312" (hexadecimal format) or "0000 0000 0000 0001 1011 0011 0001 0010" and a BS_SHIFT value of 16 is inputted into the searching circuit. The underlined text indicates bits which are used as the most significant bits of the 32-bit bitstream during the next clock cycle. The LSB zero count output equals one, and the MSB zero count output equals fifteen. The adder 13 determines the ZBSO value to be zero based on the above equation, which is then stored in the register 14 as the LBS_Store value. The previously stored LBS_Store value of eighteen is outputted to the adder 5. The LBS_Store value is added with the MSB zero count output of fifteen, which results in a S_value of thirty-two.

Because the S_value of thirty-two is larger than twenty-three, the comparator outputs an appropriate potential level of the enable signal EN1 to activate the start code detector 17. As shown in FIG. 4, the selector 22 chooses Input_1 as the output. In this case, the MSB zero count output is fifteen which is added with a value of one by the adder 21 resulting in a value of sixteen being applied at Input_0. The value of sixteen is applied to input_0 of selector 23.

Since there is no detection of an embedded start code, the selector 23 selects the value of sixteen at Input_0 as the SHIFT value. Hence, sixteen bits of the current bitstream is shifted out, and the new bitstream at the next clock cycle will have the remaining sixteen bits as the sixteen most significant bits. With the activation of the start code detector 17, the OR gate 24 outputs a detect output signal indicating detection of a start code, which is initially stored in the register 18 during clock cycle 4.

At clock cycle 5, a 32-bit bitstream of "B3123456" or "1011 0011 0001 0010 0011 0100 0101 0110" and a BS_SHIFT value of 8 is inputted into the circuit 10. As shown, the remaining 16 bits "B312" of clock cycle 4 bitstream has not been shifted out. The LSB zero count output equals one, and the MSB zero count output equals zero. The adder 13 determines the ZBSO value to be zero based on the above equation, which is then stored in the register 14 as the LBS_Store value. The previously stored LBS_Store value of zero is outputted to the adder 15. The LBS_Store value is added with the MSB zero count output, which results in a S_value of 0.

The start code detector 17 is not activated, and a SHIFT value of thirty-two is outputted, and a detect output signal indicating non-detection of the start code is loaded into the register 18. At the same time, the register 18 outputs the previously stored detect output signal, and the enable signal EN2 activates the start code decoder 19. The upper eight bits "B3" or "1011 0011" is logically ORed with the enable signal, and one of the output lines, e.g., Sequence_Start, GOP_Start, Picture_Start, Slice_Start, etc, is activated to identify the MPEG bitstreams.

At the sixth clock cycle, a new 32-bit bitstream of "12345678" (hexadecimal format) or "0001 0010 0011 0100 0101 0110 0111 1000" and a BS_SHIFT value of twelve is inputted into the searching circuit. The LSB and MSB zero count outputs are three. The adder 13 determines the ZBSO value to be zero, which is then stored in the register 14 as the LBS_Store value. The previously stored LBS_Store value of zero is outputted to the adder 5. The LBS_Store value is added with the MSB zero count output, which results in a S_value of three.

Since the S_value is less than twenty-three, the enable signal EN1 from the comparator does not activate the start code detector 17. The start code detector 17 automatically outputs a SHIFT value of thirty-two, which is sent to the VLD or CPU to shift in a new 32-bit bitstream. The detect output signal from the start code detector indicates non-detection of the start code. Hence, when the detect output signal is outputted from the register 18 during the next clock cycle, e.g., clock cycle 7, the DETECT signal indicates non-detection of a start code, and the start code decoder 19 is not activated.

During the Nth clock cycle, a start code is embedded in the 32-bit bitstream of "80000010" or "1000 0000 0000 0000 0000 0000 0001 0000", where the bold binary numbers indicate the start code prefix, and the underlined binary numbers indicate part of the start code value. A BS_SHIFT value equals thirty-two, and the LSB zero count output equals four. Hence, the ZBSO value equals four. Since the S_Value is less than twenty-three, where Y is a LBS_Stored value from the previous clock cycle, the enable signal EN1 indicates a non-detection of a start code.

However, the embedded start code detector 25 detects the start code in the Nth bitstream by counting the number of consecutive zeros in the bitstream. If the count value is greater than or equal to twenty-three, the detector 25 outputs a 6-bit value indicative of the number of consecutive zeros, the number of most significant bits prior to the first zero of the consecutive zeros and addition of one bit to take into account the binary "1" after the last consecutive zero. In this instance, the 6-bit output has a value of twenty-eight applied at Input_1 of the selector 23. Since the 1-bit output of the detector 25 indicates a detection of the embedded start code, the selector selects Input_1 as the SHIFT value equalling twenty-eight. Further, the detect output signal of the OR gate 24 indicating detection of the start code is stored in the register 18 for use during the next clock cycle.

At clock cycle N+1, a 32-bit bitstream of "00ABCDEF" or "0000 0000 1010 1011 1100 1101 1110 1111" is applied to the circuit 10, where the first four upper bits are the last four lower bits of the Nth bitstream. The detect output signal stored in register 18 is outputted to activate the start code decoder 19. The same operation as describe above for the fifth clock cycle is repeated to decode the start code value. These processes are repeated for the bitstreams inputted into the circuit 10.

With the improved high bit rate start code searching architecture/circuit 10, the functionality and performance of the entire video display system is increased. The ability to quickly and systematically detect the start codes also improves error recovery. If an error is detected during the decoding of the MPEG bitstreams, the next start code needs to be quickly searched and detected. If not, the delay increases the loss of data in the bitstreams after the occurrence of the error.

The improved architecture/circuit continuously monitors the bitstreams and compensates for unexpected detection of a start code. When a start code is imbedded in a bitstream which is suppose to have no, start codes, the prior art failed to recognize this error until it is detected during the decoding process. At that time, the data from the occurrence of the start code in the bitstream and the received bitstream of data by the VLD or CUP at the time of error detection is discarded. The longer the lapse of period to detect the error, the more the data is lost. Such discarded data may contain important information. Unlike the conventional device, the improved architecture/circuit immediately detects the error and initiates error recovery to prevent loss of data.

This architecture/circuit has other major advantages over existing designs. First, when searching for a start code, 32 bits can be processed per clock cycle without increasing the bitstream input bus width. Prior simple designs could only process 8 or 9 bits per clock cycle with a 32-bit input. By using the zero bit counters, this circuit is also very small in area and requires little power. To achieve a 32-bit per clock cycle processing speed, prior designs used an additional barrel shifter and 32-bit registers. These other designs are large in chip area and consume a large amount of power. The high bit rate start code searching and detecting circuit of the present invention is approximately 60% smaller in gate count over a design using barrel shifters.

This circuit can be used during all operations of MPEG bitstream decoding, including normal decoding, start code searching, and error modes. It will detect a start code at any time and in any position of the bitstream. Other designs require the start codes to be "byte aligned", or occurring only in a predicted 8-bit position.

The foregoing embodiment is merely exemplary and not to be construed as limiting the MPEG encoded bitstreams. The present architecture can be applied to many different decoding systems requiring the detection of start codes, which can be accomplished by easily modifying the width of the bit lines and zero counters. Many alternatives, modifications and variations will be apparent to those skilled in the art. For example, one of ordinary skill in the art can implement the hardware operation in a CPU operating under a firmware.

I claim:

1. A circuit for searching a bitstream for a start code having a start code prefix and a start code value upon a clock cycle N (N being an integer), comprising:

first means for determining a first number indicative of consecutive zeros in predetermined least significant bits of a bitstream;

second means for determining a second number indicative of consecutive zeros in predetermined most significant bits of the bitstream; and means for detecting the start code when the first and second numbers have a prescribed relationship.

2. The circuit of claim 1, wherein a sum of the first number determined during a clock cycle N and the second number determined during the next clock cycle N+1 is at least equal to a prescribed value.

3. The circuit of claim 1, wherein said detecting means further detects the start code prefix embedded within the bitstream.

4. The circuit of claim 1, wherein said first means comprises:

a first counter receiving the predetermined number of least significant bits of the bitstream to count the consecutive zeros, and outputting a first zero count value; and a register to store the first number based on the first zero count value upon clock cycle N.

5. The circuit of claim 4 further comprising an adder to sum said first zero count value with an external value from which sum a constant value is subtracted, wherein if a result produced by the adder is less than zero, the first number is set to a preset value.

6. The circuit of claim 4, wherein said second means comprises a second counter receiving the predetermined number of most significant bits of the bitstream to count the consecutive zeros, and outputting a second zero count value.

7. The circuit of claim 1, wherein the detecting means comprises:

an adder which sums the first number determined during clock cycle N and the second number determined during clock cycle N+1;

a comparator which compares the sum with a prescribed value and outputs an enable/disable signal during clock cycle N+1 when said sum is at least equal to the prescribed value; and a start code detector responsive to the enable/disable signal to detect the start code, wherein the start code detector outputs a SHIFT value indicating a number of bits to be shifted out from the bitstream upon clock cycle N+1, and bits which have not been shifted out being the most significant bits of the bitstream upon clock cycle N+2, and outputs a detect output signal indicating detection of the start code when the sum is at least equal to the prescribed value.

8. The circuit of claim 7 further comprising:

a register to store the detect output signal during clock cycle N+1; and a decoder responsive to the detect output signal outputted from the register during clock cycle N+2, said decoder decoding a prescribed number of upper bits of the bitstream during clock cycle N+2 to output a start signal indicative of the start code.

9. The circuit of claim 7, wherein the start code detector further includes an embedded start code detector which detects the start code prefix embedded within the bitstream during clock cycle N, wherein the SHIFT value is a number indicative of the most significant bits preceding a first zero bit of the consecutive number of bits and a number of bits of the start code prefix to be shifted out from the bitstream of clock cycle N, and bits which have not been shifted out being the most significant bits of the bitstream during clock cycle N+1, and the start code detector outputs a detect output signal indicating detection of the start code when the sum is at least equal to the prescribed value.

10. The circuit of claim 9 further comprising:
a register to store the detect output signal during clock cycle N; and
a decoder responsive to the detect output signal outputted from the register during clock cycle N+1, said decoder decoding a prescribed number of upper bits of the bitstream during clock cycle N+1 to output a start signal indicative of the start code.

11. A circuit for searching a bitstream for a start code having a start code prefix and a start code value during a clock cycle N (N being an integer), comprising:
a first counter for counting consecutive zeros in predetermined least significant bits of a bitstream to output a first zero count value;
a second counter for counting consecutive zeros in predetermined most significant bits of the bitstream to output a second zero count value;
means for summing the first zero count value with a first prescribed value during the clock cycle N to output a first sum, and summing the second zero count value with the first sum to output a second sum during clock cycle N+1; and
a comparator which compares the second sum to a second prescribed value, wherein the comparator outputs a first signal indicating detection/non-detection of the start code based on the comparison.

12. The circuit of claim 11, wherein said adding means comprises:
a first adder to add the first zero count value with the prescribed value;
a first register to store the first sum; and
a second adder to add the second zero count value with the first sum.

13. The circuit of claim 11, further comprising a start code detector responsive to the first signal, wherein when said start code detector outputs a SHIFT value indicating a number of bits to be shifted out from the bitstream, and bits which have not been shifted out being the most significant bits of the bitstream during a subsequent clock cycle, and outputs a detect output signal indicating detection/non-detection of the start code.

14. The circuit of claim 13 further comprising:
a second register to store the detect output signal during clock cycle N+1; and
a decoder responsive to the detect output signal outputted from the second register during clock cycle N+2, said decoder decoding a prescribed number of upper bits of the bitstream during clock cycle N+2 to output a start signal indicative of the start code when the second sum is at least equal to the second prescribed value.

15. The circuit of claim 13, wherein the start code detector further includes an embedded start code detector which detects the start code prefix embedded within the bitstream during clock cycle N, wherein the SHIFT value is a number indicative of the most significant bits preceding a first zero bit of the consecutive number of bits and a number of bits of the start code prefix to be shifted out from the bitstream of clock cycle N, and bits which have not been shifted out being the most significant bits of the bitstream during clock cycle N+1, and the start code detector outputs a detect output signal indicating detection of the start code when the second sum is at least equal to the second prescribed value.

16. The circuit of claim 15 further comprising:
a second register to store the detect output signal during clock cycle N; and
a decoder responsive to the detect output signal outputted from the second register during clock cycle N+1, said decoder decoding a prescribed number of upper bits of the bitstream during clock cycle N+1 to output a start signal indicative of the start code.

17. A method for searching a bitstream for a start code having a start code prefix and a start code value, the method comprising the steps of:
a) determining a first number indicative of consecutive zeros in predetermined least significant bits of the bitstream;
b) determining a second number indicative of consecutive zeros in predetermined most significant bits of the bitstream;
c) summing the first number with a first prescribed value during a clock cycle N (N being an integer) to output a first sum;
d) summing the second number with the first sum to output a second sum during the next clock cycle N+1; and
e) generating a first signal indicating detection/non-detection of the start code based on a comparison of the second sum and a second prescribed value during clock cycle N+1.

18. The method of claim 17 further comprising the step of storing the first sum.

19. The method of claim 17 further comprising the steps of:
outputting a SHIFT value indicating a number of bits to be shifted out from the bitstream of clock cycle N+1, and bits which have not been shifted out being the most significant bits of the bitstream during clock cycle N+2; and
outputting a detect output signal indicating a detection of the start code when the second sum is at least equal to the second prescribed value.

20. The method of claim 19 further comprising the steps of:
storing the detect output signal during clock cycle N+1; and
decoding a prescribed number of upper bits of the bitstream during clock cycle N+2 to output a start signal indicative of the start code in response to the detect output signal.

21. The method of claim 17 further comprising the steps of: detecting the start code prefix embedded within the bitstream during clock cycle N, wherein the SHIFT value is a number indicative of the most significant bits preceding a first zero bit of the consecutive number of bits and a number of bits of the start code prefix to be shifted out from the bitstream of clock cycle N, and bits which have not been shifted out being the most significant bits of the bitstream during clock cycle N+1; and
outputting a detect output signal indicating detection of the start code.

22. The method of claim 21 further comprising the steps of:
storing the detect output signal during clock cycle N; and
decoding a prescribed number of upper bits of the bitstream during clock cycle N+1 to output a start signal indicative of the start code in response to the detected output signal during clock cycle N+1.

* * * * *